US011367537B2

(12) United States Patent
Enica et al.

(10) Patent No.: US 11,367,537 B2
(45) Date of Patent: Jun. 21, 2022

(54) ANNULAR NUCLEAR FUEL PELLETS WITH CENTRAL BURNABLE ABSORBER

(71) Applicant: Westinghouse Electric Company LLC, Cranberry Township, PA (US)

(72) Inventors: Anghel Enica, Wexford, PA (US); Scott J. Vrtiska, Sala (SE); Simon C. Middleburgh, Vasteras (SE)

(73) Assignee: Westinghouse Electric Company LLC, Cranberry Township, PA (US)

( * ) Notice: Subject to any disclaimer, the term of this patent is extended or adjusted under 35 U.S.C. 154(b) by 316 days.

(21) Appl. No.: 15/590,234

(22) Filed: May 9, 2017

(65) Prior Publication Data

US 2018/0330832 A1 Nov. 15, 2018

(51) Int. Cl.
*G21C 3/04* (2006.01)
*G21C 7/04* (2006.01)
*G21C 3/20* (2006.01)
*C08K 3/38* (2006.01)
*C09D 5/32* (2006.01)
*C09D 7/61* (2018.01)

(52) U.S. Cl.
CPC ............. *G21C 3/04* (2013.01); *G21C 3/20* (2013.01); *G21C 7/04* (2013.01); *C08K 3/38* (2013.01); *C09D 5/32* (2013.01); *C09D 7/61* (2018.01); *G21C 3/045* (2019.01); *G21C 3/048* (2019.01)

(58) Field of Classification Search
CPC ............. G21C 3/04; G21C 7/04; G21C 3/20
USPC .................................................. 376/419, 455
See application file for complete search history.

(56) References Cited

U.S. PATENT DOCUMENTS 2,984,613 A * 5/1961 Bassett ................. G21C 3/20
376/419
3,119,747 A * 1/1964 Wallace ................ G21C 3/20
376/419
(Continued)

FOREIGN PATENT DOCUMENTS

EP 0408172 A1 1/1991
GB 2258340 A 3/1993
(Continued)

OTHER PUBLICATIONS

International Search Report and Written Opinion of the International Searching Authority for PCT/US2018/027429 dated Oct. 4, 2018 (Forms PCT/ISA/220, PCT/ISA/210, PCT/ISA/237).
(Continued)

*Primary Examiner* — Jack W Keith
*Assistant Examiner* — Daniel Wasil
(74) *Attorney, Agent, or Firm* — K&L Gates LLP (57) ABSTRACT

An annular nuclear fuel pellet in combination with an inserted discrete neutron absorber. The pellet/absorber may be compatible with existing or future nuclear fuel assembly designs. The concept involves the use of nuclear fuel (e.g., uranium dioxide or uranium silicide) formed into annular fuel pellets which can then have a discrete absorber material inserted into the center of the pin. Preferably, the discrete absorber is a non-parasitic absorber. The resulting pellet/absorber can then be stacked into a fuel rod which is arranged in a nuclear fuel assembly. Dimensioning of the annular pellet and absorber and selection of the absorber material and density can allow the concept to be tailored for various nuclear fuel applications.

18 Claims, 6 Drawing Sheets

(56) References Cited

U.S. PATENT DOCUMENTS

| | | | | |
|---|---|---|---|---|
| 3,759,786 | A | * | 9/1973 | Abate-Daga ............ G21C 3/623 |
| | | | | 376/419 |
| 4,474,728 | A | * | 10/1984 | Radford ................... G21C 7/04 |
| | | | | 376/419 |
| 4,587,087 | A | * | 5/1986 | Radford ................... G21C 3/20 |
| | | | | 376/417 |
| 4,671,927 | A | * | 6/1987 | Alsop ...................... G21C 3/18 |
| | | | | 376/419 |
| 4,678,629 | A | * | 7/1987 | Popa ........................ G21C 3/18 |
| | | | | 376/455 |
| 4,687,629 | A | | 8/1987 | Mildrum |
| 4,751,041 | A | * | 6/1988 | Ferrari ..................... G21C 7/04 |
| | | | | 376/327 |
| 4,814,137 | A | | 3/1989 | Beuchel et al. |
| 4,994,233 | A | | 2/1991 | Freeman |
| 5,064,607 | A | * | 11/1991 | Miller ...................... G21C 7/00 |
| | | | | 376/333 |
| 5,075,075 | A | | 12/1991 | Kapil |
| 5,309,493 | A | * | 5/1994 | Kamimura ............ G21C 3/326 |
| | | | | 376/419 |
| 8,268,204 | B2 | | 9/2012 | Rhee et al. |
| 8,557,148 | B2 | | 10/2013 | Rhee et al. |
| 2011/0049734 | A1 | | 3/2011 | Rhee et al. |
| 2011/0121473 | A1 | | 5/2011 | Rhee et al. |
| 2013/0208848 | A1 | | 8/2013 | Zabiego et al. |
| 2013/0259188 | A1 | | 10/2013 | Oh et al. |
| 2016/0284428 | A1 | | 9/2016 | Bjork et al. |
| 2017/0043555 | A1 | * | 2/2017 | Xu .......................... B32B 15/01 |
| 2018/0151261 | A1 | * | 5/2018 | Yonghee ................. G21C 3/20 |

FOREIGN PATENT DOCUMENTS

| | | | | |
|---|---|---|---|---|
| JP | S601591 | A | * | 1/1985 |
| JP | 5-40186 | | * | 2/1993 |
| KR | 1999-0085212 | | * | 12/1999 |
| KR | 2001-0001112 | | * | 1/2001 |
| KR | 2009-0037633 | | * | 10/2009 |
| KR | 10-2016-0158622 | | * | 11/2016 |
| WO | 97/01174 | A1 | | 1/1997 |
| WO | WO-9701174 | A1 | * | 1/1997 ............... G21C 3/02 |
| WO | 2017030775 | A1 | | 2/2017 |
| WO | 2018208432 | A1 | | 11/2018 |

OTHER PUBLICATIONS

International Search Report and Written Opinion for International PCT Application No. PCT/US2018/027429, dated Oct. 4, 2018.

International Report on Patentability for International PCT Application No. PCT/US2018/027429, dated Oct. 4, 2018.

European Supplementary European Search Report for corresponding European Patent Application No. 18798686.4, dated Dec. 15, 2020.

* cited by examiner

ANNULAR NUCLEAR FUEL PELLETS WITH CENTRAL BURNABLE ABSORBER

BACKGROUND

1. Field

This invention relates in general to nuclear reactors and more particularly to fuel elements for nuclear reactors having an extended life within the core.

2. Related Art

One form of a nuclear reactor power generation system in which this invention may be employed is a pressurized water reactor nuclear power generation system, though it should be appreciated that this invention is applicable to many other nuclear reactor designs, such as BWR (boiling water reactor) designs, CANDU (CANadiam Deuterium Uranium) reactor designs, etc. However, a pressurized water reactor system will be discussed hereafter as one of many exemplary systems in which this invention may be employed. The primary side of pressurized water nuclear reactor power generating systems which are cooled with water under pressure comprises a closed circuit which is isolated from and in heat exchange relationship with a secondary circuit for the production of useful energy. The primary circuit comprises the reactor vessel enclosing a core internal structure that supports a plurality of fuel assemblies containing fissile material, the primary circuit within heat exchange steam generators, the inner volume of a pressurizer, pumps and pipes for circulating pressurized water; the pipes connecting each of the steam generators and pumps to the reactor vessel independently. Each of the parts of the primary circuit comprising a steam generator, a pump, and a system of pipes which are connected to the vessel form a loop of the primary circuit.

Figure 1:
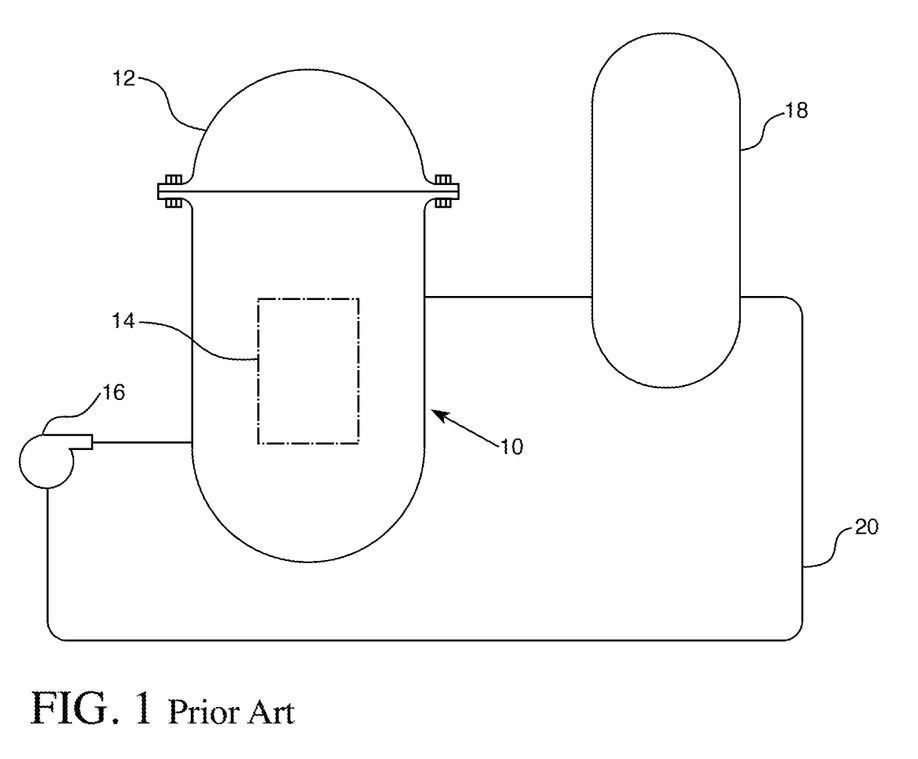
FIG. 1 is a schematic representation of the primary side of a nuclear power generating system.

For the purpose of illustration, FIG. 1 shows a simplified nuclear reactor primary system, including a generally cylindrical reactor pressure vessel 10 having a closure head 12 enclosing a nuclear core 14. A liquid reactor coolant, such as water, is pumped into the vessel 10 by pump 16, through the core 14 where heat energy is absorbed and is discharged to a heat exchanger 18, typically referred to as a steam generator, in which heat is transferred to a utilization circuit (not shown), such as a steam driven turbine generator. The reactor coolant is then returned to the pump 16, completing the primary loop. Typically, a plurality of the above-described loops are connected to a single reactor vessel 10 by reactor coolant piping 20.

Figure 2:
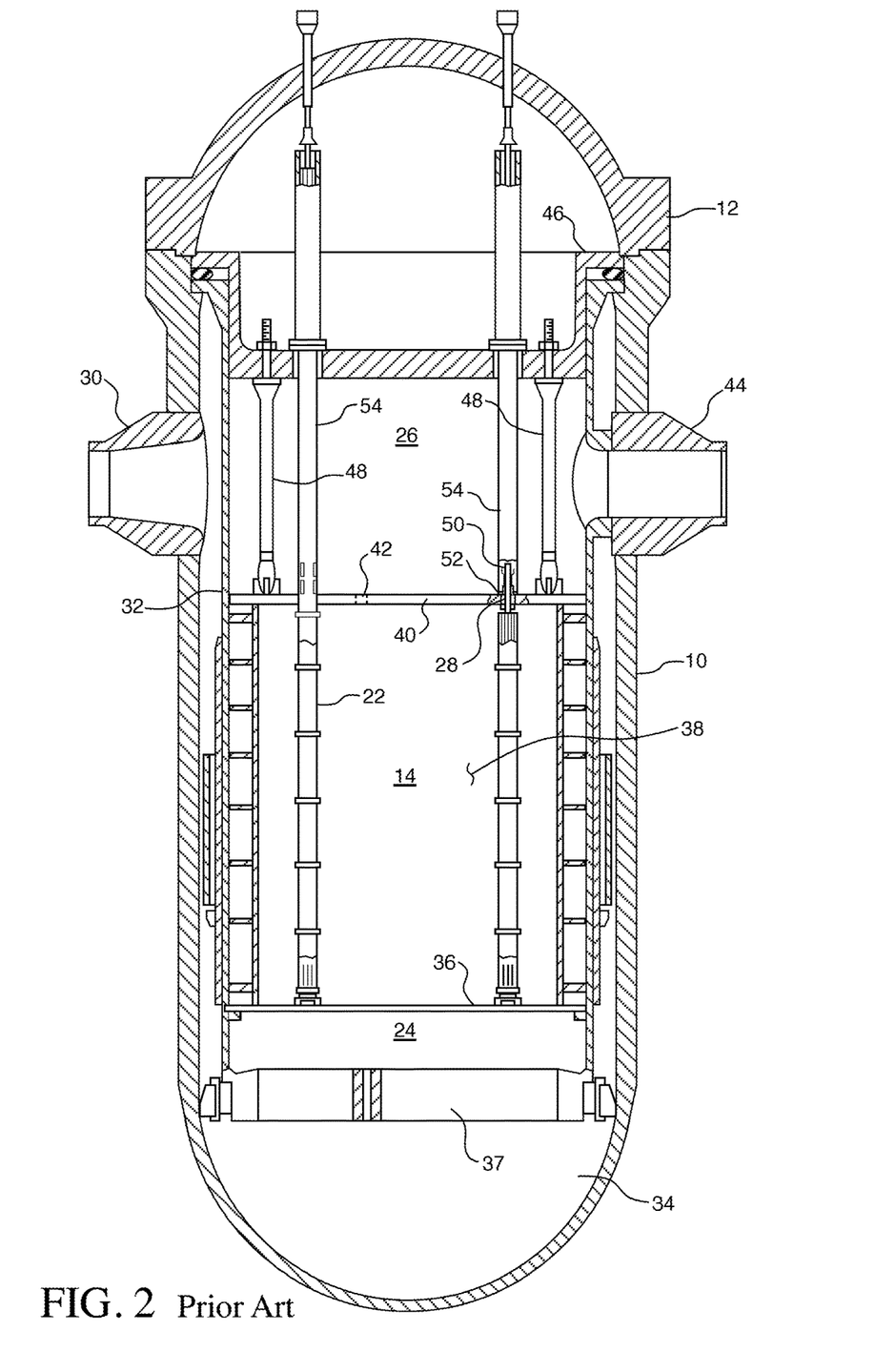
FIG. 2 is an elevational view, partially in section, of a nuclear reactor vessel and internal components to which the embodiments described hereafter can be applied.

An exemplary reactor design is shown in FIG. 2. In addition to the core 14 comprised of the plurality of parallel, vertical, co-extending fuel assemblies 22, for purposes of this description, the other vessel internal structures can be divided into the lower internals 24 and the upper internals 26. In conventional designs, the lower internals' function is to support, align and guide core components and instrumentation as well as direct flow within the vessel. The upper internals restrain or provide a secondary restraint for the fuel assemblies 22 (only two of which are shown for simplicity in FIG. 2), and support and guide instrumentation and components, such as control rods 28. In the exemplary reactor shown in FIG. 2, coolant enters the reactor vessel 10 through one or more inlet nozzles 30, flows down through an annulus between the vessel and the core barrel 32, is turned 180° in a lower plenum 34, passes upwardly through a lower support plate 37 and a lower core plate 36 upon which the fuel assemblies are seated and through and about the assemblies. The exact configuration for coolant flow varies with different nuclear reactor designs. The coolant flow through the core and surrounding area 38 is typically large on the order of thousands of kilograms per second. Coolant exiting the core 14 flows along the underside of the upper core plate 40 and upwardly through a plurality of perforations 42. The coolant then flows upwardly and radially to one or more outlet nozzles 44. In some cases, such as boiling water reactor designs, the coolant may first pass through additional internal reactor components such as components for improving steam quality of the coolant before exiting the reactor vessel.

The upper internals 26 can be supported from the vessel or the vessel head and include an upper support assembly 46. Loads are transmitted between the upper support assembly 46 and the upper core plate 40, primarily by a plurality of support columns 48. Essentially, each of the support columns is aligned above a selected fuel assembly 22 and perforations 42 in the upper core plate 40.

Rectilinearly moveable control rods 28, which typically include a drive shaft 50 and a spider assembly 52 of neutron poison rods (more fully illustrated in FIG. 3), are guided through the upper internals 26 and into aligned fuel assemblies 22 by control rod guide tubes 54. The guide tubes are fixedly joined to the upper support assembly 46 and the top of the upper core plate 40. The support column 48 arrangement assists in retarding guide tube deformation under accident conditions which could detrimentally affect control rod insertion capability.

Figure 3:
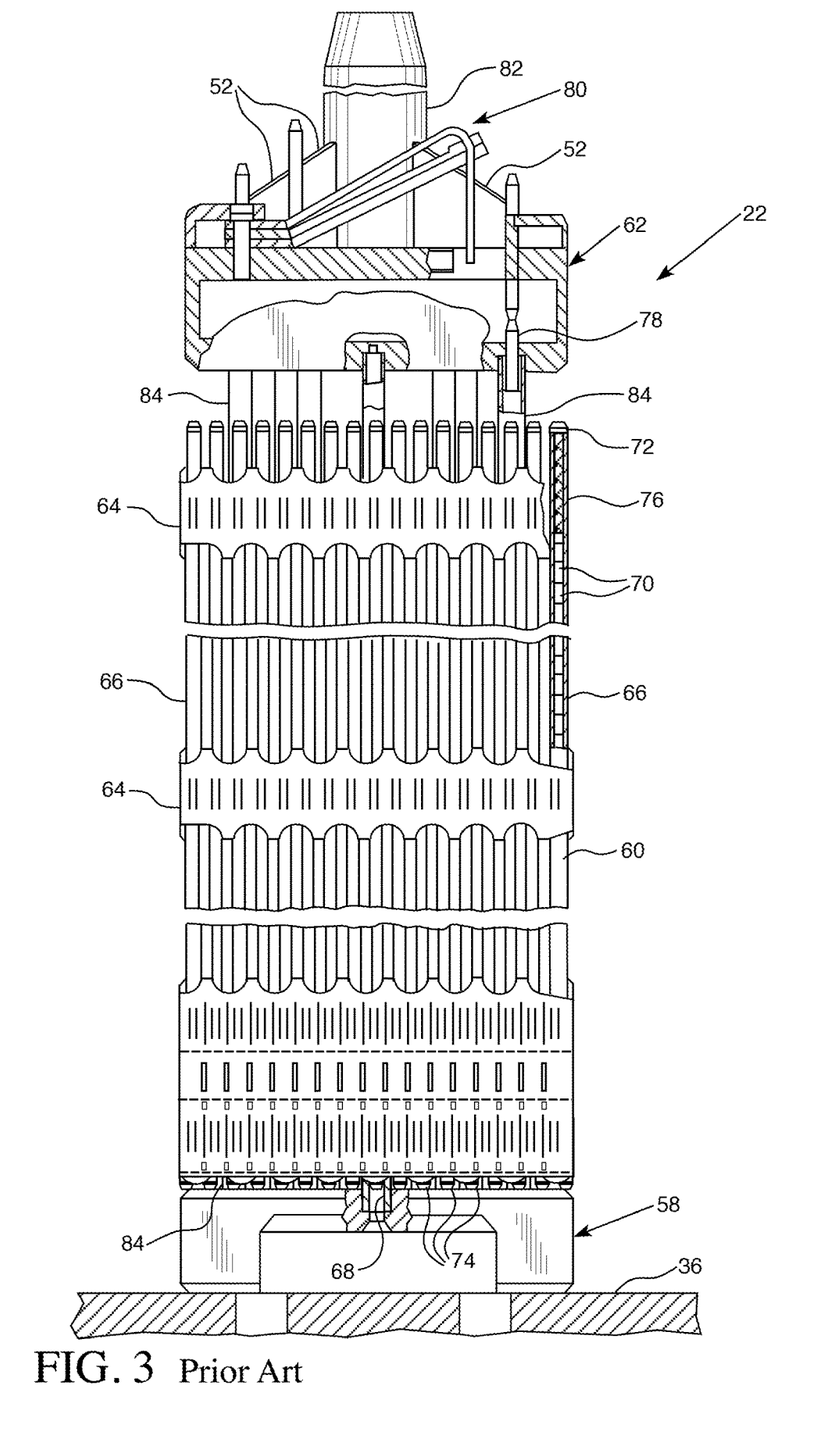
FIG. 3 is an elevational view, partially in section, of a fuel assembly illustrated in vertically shortened form, with parts broken away for clarity.

FIG. 3 is an elevational view, represented in vertically shortened form, of an exemplary fuel assembly being generally designated by reference character 22. The exemplary fuel assembly 22 is one typically used in a pressurized water reactor; however the present invention is not restricted to pressurized water reactor fuel and could be applied to any conceivable nuclear fuel assembly design which is comprised of a plurality of cylindrical fuel rods containing fissile and/or neutron absorbing material. Present variations in nuclear reactor fuel assemblies for other reactor designs can also include, for example, neutron moderating rods or components, debris filter components, coolant directing components, fuel rods of varying height, and, for some applications, box walls forming a channel surrounding ach fuel assembly. The exemplary fuel assembly 22 has a structural skeleton which, at its lower end, includes a bottom nozzle 58. The bottom nozzle 58 supports the fuel assembly 22 on the lower core plate 36 in the core region of the nuclear reactor. In addition to the bottom nozzle 58, the structural skeleton of the fuel assembly 22 also includes a top nozzle 62 at its upper end and number of guide tubes or thimbles 84 which align with the guide tubes 54 in the upper internals. The guide tubes or thimbles 84 extend longitudinally between the bottom and top nozzles 58 and 62 and at opposite ends are rigidly attached thereto.

The fuel assembly 22 further includes a plurality of transverse grids 64 axially spaced along and mounted to the guide thimbles 84 and an organized array of elongated fuel rods 66 transversely spaced and supported by the grid 64. The grids 64 conventionally formed from an array of orthogonal straps that are interleaved in an egg-crate pattern with the adjacent interface of four straps defining approximately square support cells, many of which support the fuel rods 66 in a transversed, spaced relationship with each other. The remaining cells are occupied by the control rod guide thimbles 84 and an instrument thimble 68. As shown in FIG. 3, the instrument tube or thimble 68 is located in the center of the fuel assembly and extends between and is captured by the bottom and top nozzles 58 and 62. With such an arrangement of parts, fuel assembly 22 forms an integral unit capable of being conveniently handled without damaging the assembly of parts.

As mentioned above, the fuel rods 66 in the array thereof in the assembly 22 are held in spaced relationship with one another by the grids 64 spaced along the fuel assembly length. Each fuel rod 66 includes a plurality of nuclear fuel pellets 70 and is closed at its opposite ends by upper and lower end plugs 72 and 74. The pellets 70 may be maintained in a stack by plenum spring 76 disposed between the upper end plug 72 and the top of the pellet stack. The pellets 70, composed of fissile material, are responsible for creating the reactive power of the reactor. The cladding 60 which surrounds the pellets 70 functions as a barrier to prevent the fission by-products from entering the coolant and further contaminating the reactor system.

To control the fission process in the exemplary fuel assembly 22, a number of control rods 78 are reciprocally moveable in the guide thimbles 84 located at predetermined positions in the fuel assembly 22. In the exemplary fuel assembly configuration 22, a rod cluster control rod mechanism 80, positioned above the top nozzle 62 supports a plurality of the control rods 78. The control rod mechanism 80 has an internally threaded cylindrical hub member 82 with a plurality of radially extending flukes or arms 52 that form the spider assembly previously noted with regard to FIG. 2. Each arm 52 is interconnected to a control rod 78 such that the control rod mechanism is operable to move a plurality of the control rods vertically in the respective guide thimbles 84 to thereby control the fission process in the fuel assembly 22, under the motive power of a control rod drive shaft 50 which is coupled to the control rod hub 80 all in a well-known manner.

Movement of the control rods is used to shape the axial and radial power distribution to maintain the peak fuel rod cladding temperatures within acceptable limits as well as to control excess reactivity during the fuel cycle operation. To monitor this process, and to provide information for the control and protection systems, in-core neutron monitors for monitoring the neutron radiation and thermocouples for monitoring the core exit temperature may be provided within or adjacent to a number of the fuel assemblies.

Nuclear fuel must be designed such that fissile material will be utilized gradually. To accomplish this, many nuclear fuel designs will incorporate burnable neutron absorbing material to assist in controlling the fission reaction in the core. The burnable absorbers are designed to "burn" or deplete along with the fissile material and will typically incorporate neutron absorbing isotopes of boron or gadolinium for this purpose. Particles containing the neutron absorbing material have typically been incorporated within the fissile material of the nuclear fuel pellets or coated on the exterior of the pellets. For high power density reactors with very long fuel cycles (i.e., 2 years or more), very slow-burning neutron absorbers are desired. Typical applications today require an absorber like gadolinium which has a drawback in that some of the isotopes present in the material may have a low neutron absorption cross-section and, therefore, do not fully burn out before the fissile material is sufficiently utilized. This results in a residual burnable poison reactivity worth at the end of the fuel life. This "reactivity penalty" has an economic impact on fuel loading and enrichment requirements.

Current nuclear fuel burnable absorbers in PWRs and BWRs such as IFBA and gadolinia ($Gd_2O_3$) have drawbacks such as manufacturing challenges and variability. The neutronic modeling of the burnable absorbers also poses many challenges and adds complexity to nuclear physics analyses.

An important limitation on nuclear fuel operation is the fuel temperature which peaks in the center of the pellet. Current fuel pellets with integral absorbers may have additional limitations due to poor heat conductivity properties. Such fuel limitations directly impact fuel cost and efficiency as well as plant safety margins. Thus, it is an objective of this invention to provide a new fuel pellet design that is specifically configured to more efficiently operate with extended fuel cycles.

SUMMARY

This invention satisfies the foregoing objective by providing a nuclear fuel assembly design that comprises a parallel array of elongated nuclear fuel rods supported in a spaced relationship with each other, between a lower nozzle and an upper nozzle, with the nuclear fuel rods having an axial length along their elongated dimension. At least some of the nuclear fuel rods comprise a tubular cladding that extends over the axial length and is closed at a lower end by a bottom end plug and is closed at an upper end by a top end plug. A stack of a plurality of fuel pellets occupies a lower portion of an interior of the cladding with at least some of the fuel pellets in the stack having an annular shape with a discrete neutron absorber substantially occupying a center of at least some of the annular fuel pellets. Preferably, the discrete neutron absorber is one or more of the neutron absorbers typically employed in control rods, such as boron, boron carbide or silver-indium-cadmium.

In one embodiment, the discrete absorber is formed separately from the annular fuel pellet and then inserted into the central opening of the annular fuel pellet. Preferably, the discrete absorber is structured as a rod or pin and is sized to extend through the central opening in one or more annular pellets, for example, to extend a discrete absorber through ten annular pellets.

In another embodiment, one or more of the annular pellets with a discrete absorber in the central opening is inserted between two fuel pellets without a central discrete absorber. Preferably, the two fuel pellets without a central discrete absorber are solid fuel pellets without a central opening.

In a further embodiment the inside of the central opening of the annular fuel pellet or the outside of an interfacing surface of the discrete absorber is coated with a material compatible with both the annular pellet material and the discrete absorber material. Examples of the coating process may be PVD, ALD, cold spray or electroplating and examples of the coating may be molybdenum or tungsten. Preferably, the coating is on the order of 0.5 to 100 μm.

The invention also contemplates a nuclear reactor having a core comprising the nuclear fuel assemblies described above.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 4:
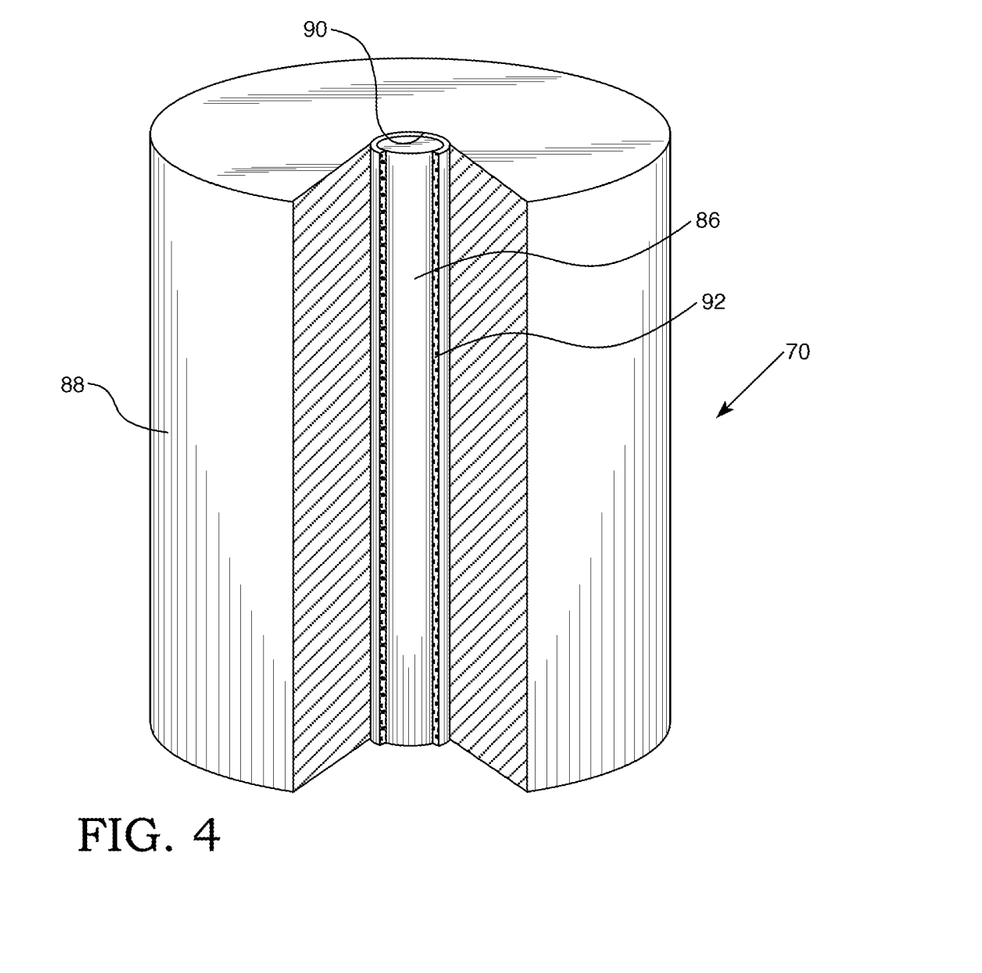
FIG. 4 is a perspective view of one embodiment of the fuel pellet of this invention showing an annular pellet with a discrete absorber in the central opening.

One preferred embodiment is an annular fuel pellet, as illustrated in FIG. 4, formed from 100% uranium dioxide, uranium nitride or uranium silicide (or combination thereof), enriched in U-235 as desired (currently up to 4.95 w/o) with similar dimensions to current fuel pellet geometries, so that the annular pellets 88 can replace the prior art pellets currently in use (e.g., IFBA, gadolinium pellets). Discrete burnable absorber pins 86 are manufactured separately and inserted into the center annulus 90 of the annular pellets after the pellets are formed. The term "discrete burnable absorber pin" is intended to refer to a pin formed entirely from one or more absorber elements or compounds without the inclusion of any fissile material. Preferably, the burnable absorber elements or compounds in the discrete burnable absorber pin are non-parasitic absorbers; that is absorbers that upon absorbing a neutron do not form an isotope that is also a neutron absorber.

While the absorber 86 material could vary, a preferred concept involves the use of a hot isostatic pressed or sintered boron carbide or B4C/Al$_2$O$_3$ pin that is similar to those which are built for Westinghouse control rods. Such pins are extremely hard and can achieve high densification to accommodate swelling.

Figure 6:
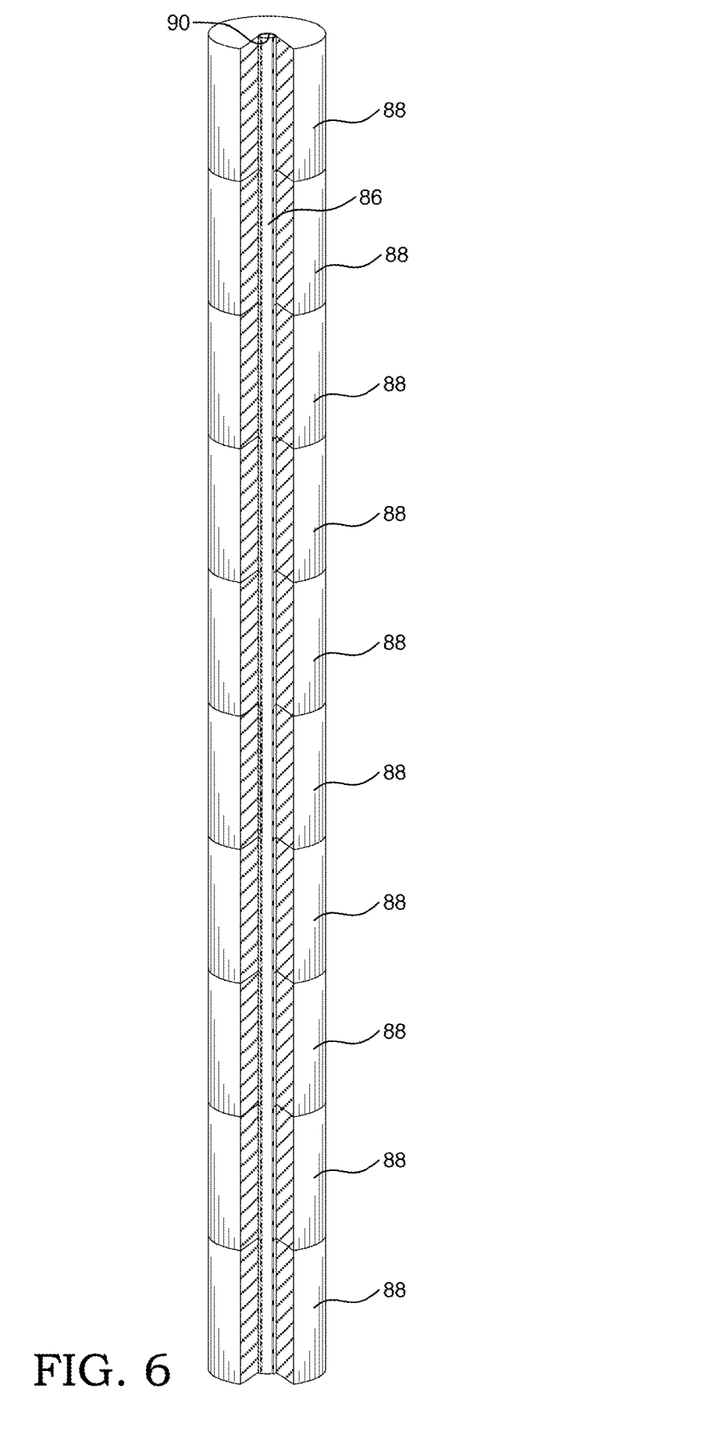
FIG. 6 is schematic illustration of a third embodiment showing ten annular pellets stacked in tandem with one solid absorber pin extending through the center of all ten pellets.

An absorber pin 86 may be one or more pellets in length depending on what is practical for manufacturing and what minimizes variability. One embodiment envisions approximately 5-10 pellets skewered by one absorber pin as illustrated in FIG. 6. These pellet/absorber pin combinations are then stacked into a conventional fuel rod 66 for integration into a fuel assembly 22.

By varying the dimensions of the pellet hole 90 and absorber and also varying the absorber material and density, the concept could be optimized for various applications. The use of boron as the primary neutron absorbing material is desired as it can greatly reduce the residual reactivity penalty associated with absorbers like gadolinium.

Figure 5:
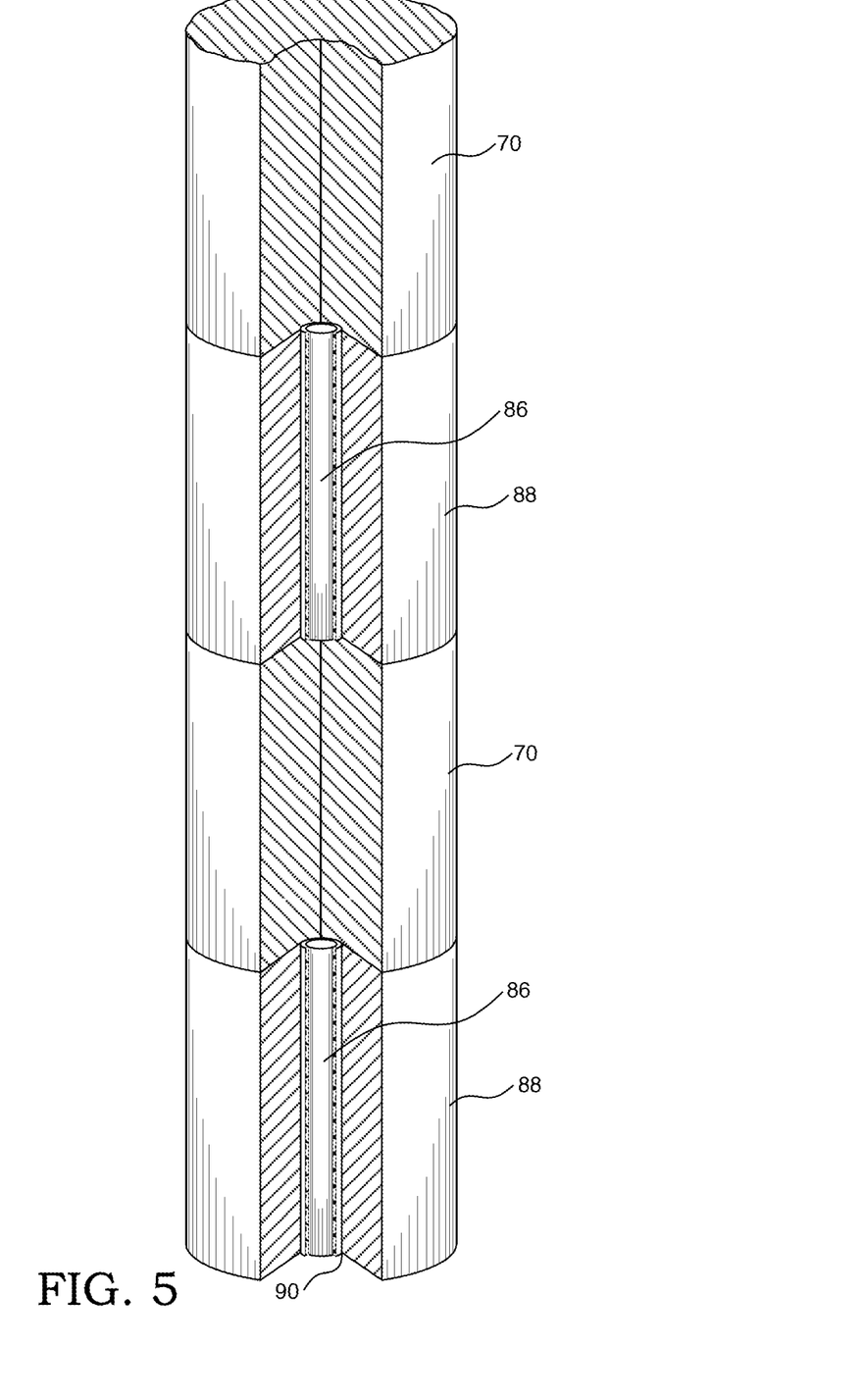
FIG. 5 is a schematic illustration of a second embodiment employing several annular pellets stacked in tandem between solid pellets.

Alternate embodiments may include applying the concept to other fuel or absorber materials. Axial arrangements in the fuel rod may involve fully loaded pellet/absorber combinations, or a mix with conventional fuel pellets (e.g., some form of "tiger striping" or alternating of annular pellet/absorber with conventional fuel pellet might be considered) as illustrated in FIG. 5.

As the absorber pin material may not be chemically compatible with the fuel material a coating 92 (applied via PVD (Physical Vapor Deposition), ALD (Atomic Layer Deposition), cold spray or electroplating methods for example) can be applied to the pin before insertion into the fuel. The coating is extremely thin (preferably <1 μm) and therefore the material has very little neutronic impact. High temperature metallic coatings such as Mo and W would suffice.

Burnable absorbers in the commercial nuclear industry are typically integrated into the fuel or coated on the fuel and do not involve the concept of discrete poisons in an annular pellet. The use of discrete poisons has only existed outside of the fuel rod (e.g., WABA (Wet Annular Burnable Absorber)). The components for the preferred embodiment of the invention exist in separate products (PWR fuel/BWR control rods), but have never been considered together.

A common absorber used in PWR (Pressurized Water Reactor) applications is the IFBA (Integral Fuel Burnable Absorber) coating which is deposited on the outside of a fuel pellet. In this configuration, the absorber burns extremely fast and is therefore poorly suited for very long cycle applications. Due to neutron self-shielding, the use of an absorber like dense boron in the center of the pellet will provide the slow absorber depletion needed to control reactivity in a very long (2 or more year cycle). With this concept, boron (rather than absorbers like gadolinium) could now be used as the primary burnable absorber in long cycle applications.

The annular pellet design flattens temperature across the pellet, improving safety margins for the plant and allows for more efficient core loadings and operation.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof

What is claimed is:

1. A nuclear fuel assembly comprising:
    a parallel array of elongated nuclear fuel rods supported in a spaced relationship with each other, between a lower nozzle and an upper nozzle and having an axial length along the elongated dimension of the nuclear fuel rods;
    at least some of the nuclear fuel rods comprise:
        a tubular cladding extending over the axial length and closed at a lower end by a bottom end plug and closed at an upper end by a top end plug;
        a stack of a plurality of fuel pellets occupying a lower portion of an interior of the cladding with at least some of the fuel pellets in the stack of fuel pellets having an annular shape with a central opening;
        a discrete neutron absorber substantially occupying the central opening of at least some of the annular fuel pellets, and the discrete neutron absorber is free of fissile material and primarily comprised of boron or boron carbide, wherein the discrete neutron absorber is structured as a rod; and
        a metallic coating applied to at least one of an inside surface of the central opening of the annular fuel pellets and an outside surface of the discrete neutron absorber, opposite the inside surface, wherein the metallic coating is selected from the group consisting of molybdenum, a molybdenum alloy, tungsten, and a tungsten alloy, wherein the metallic coating has a total thickness in a range of 0.5 to 100 um.

2. The nuclear fuel assembly of claim 1 wherein the discrete neutron absorber consists of a neutron absorbing material.

3. The nuclear fuel assembly of claim 2 wherein the discrete neutron absorber consists of boron, boron carbide, or a boron carbide and aluminum oxide mixture.

4. The nuclear fuel assembly of claim 1 wherein the discrete neutron absorber is structured as a rod and is sized to extend through the central opening in more than one annular fuel pellet.

5. The nuclear fuel assembly of claim 1 wherein one or more of the annular fuel pellets with a discrete neutron absorber in the central opening is inserted between two fuel pellets without a central discrete absorber.

6. The nuclear fuel assembly of claim 5 wherein the two fuel pellets without a central discrete absorber are solid fuel pellets without a central opening.

7. The nuclear fuel assembly of claim 1 wherein the coating is applied with a physical vapor deposition, an atomic layer deposition, a cold spray or an electroplating process.

8. A nuclear reactor having a core comprising a plurality of nuclear fuel assemblies, with at least some of the fuel assemblies comprising:
a parallel array of elongated nuclear fuel rods supported in a spaced relationship with each other, between a lower nozzle and an upper nozzle and having an axial length along the elongated dimension of the nuclear fuel rods;
at least some of the nuclear fuel rods comprise:
a tubular cladding extending over the axial length and closed at a lower end by a bottom end plug and closed at an upper end by a top end plug;
a stack of a plurality of fuel pellets occupying a lower portion of an interior of the cladding with at least some of the fuel pellets in the stack of fuel pellets having an annular shape with a central opening;
a discrete neutron absorber substantially occupying the central opening of at least some of the annular fuel pellets,
and the discrete neutron absorber is free of fissile material; and
a metallic coating applied to at least one of an inside surface of the central opening of the annular fuel pellets and an outside surface of the discrete neutron absorber, opposite the inside surface, wherein the metallic coating is selected from the group consisting of molybdenum, a molybdenum alloy, tungsten, and a tungsten alloy, wherein the metallic coating has a total thickness in a range of 0.5 to 100 um.

9. A nuclear fuel assembly comprising:
a stack of a plurality of fuel pellets, wherein at least some of the fuel pellets in the stack of fuel pellets have an annular shape defining an annulus;
a pin disposed within the annulus of the at least some of the fuel pellets, the pin consists of boron, boron carbide, silver-indium-cadmium, or a boron carbide and aluminum oxide mixture; and
a metallic coating applied to at least one of an inside surface of the fuel pellets and an outside surface of the pin, opposite the inside surface, wherein the metallic coating is selected from the group consisting of molybdenum, a molybdenum alloy, tungsten, and a tungsten alloy, wherein the metallic coating has a total thickness in a range of 0.5 to 100 um.

10. The nuclear fuel assembly of claim 9, wherein the plurality of fuel pellets comprise uranium dioxide, uranium nitride, uranium silicide, or a combination thereof.

11. The nuclear fuel assembly of claim 9, wherein the pin extends through the annulus of at least five fuel pellets of the plurality of fuel pellets.

12. The nuclear fuel assembly of claim 9, wherein the metallic coating is applied to at least the inside surface of the fuel pellets.

13. The nuclear fuel assembly of claim 9, wherein the metallic coating is applied to at least the outside surface of the pin.

14. The nuclear fuel assembly of claim 9, wherein the metallic coating consists of tungsten.

15. The nuclear fuel assembly of claim 9, wherein the annular shape is a continuous annular shape.

16. The nuclear fuel assembly of claim 9 wherein the pin is sized to extend through the a central opening in only one annular fuel pellet.

17. The nuclear fuel assembly of claim 9 wherein the coating is applied with a physical vapor deposition, an atomic layer deposition, a cold spray, or an electroplating process.

18. The nuclear fuel assembly of claim 9 wherein the metallic coating has a total thickness of less than 1 um.

\* \* \* \* \*